Nov. 7, 1961                  J. C. FISK                  3,007,250
ADJUSTABLE INDICATOR HOLDING DEVICE
Filed March 27, 1959                                    2 Sheets-Sheet 1
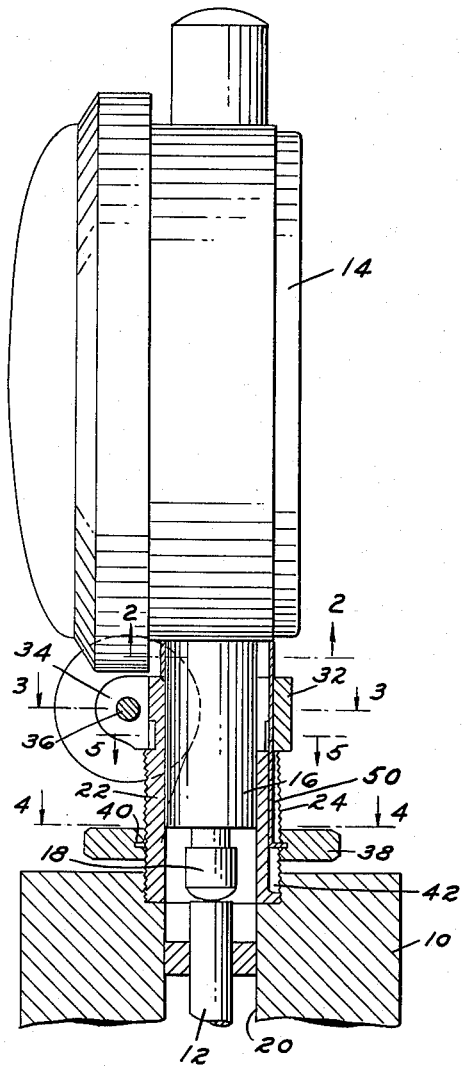
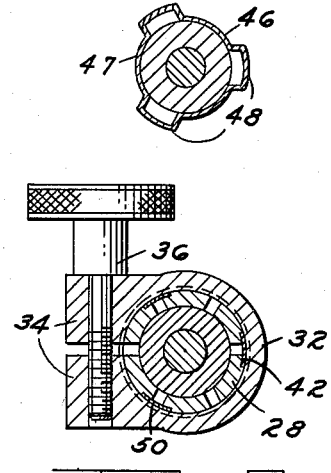
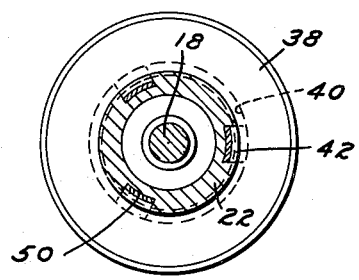
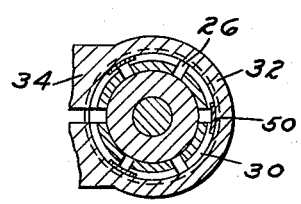
INVENTOR.
JAMES C. FISK
BY
*Burton & Parker*
ATTORNEYS Nov. 7, 1961 J. C. FISK 3,007,250
ADJUSTABLE INDICATOR HOLDING DEVICE
Filed March 27, 1959 2 Sheets-Sheet 2

INVENTOR.
JAMES C. FISK
BY
Burton & Parker
ATTORNEYS

United States Patent Office 3,007,250
Patented Nov. 7, 1961

3,007,250
ADJUSTABLE INDICATOR HOLDING DEVICE
James C. Fisk, % Fisk Tool Company, G-3219 E. Bristol Road, Flint 7, Mich.
Filed Mar. 27, 1959, Ser. No. 802,400
8 Claims. (Cl. 33—172)

This invention relates to an improved holding device adapted to mount an indicator having a stem upon a machine element, gauging fixture or the like in such a manner that the indicator accurately serves its intended function as a sensing or indicating device for such element or fixture.

In industry there are many places where it is necessary or desirable to attach a conventional dial indicator, an air gauge jet, an electric or electronic gauge pickup, or other sensing device to engage a fixture or machine element in such a manner that the indicator will accurately show the operation of the part to which it is attached.

It is also desirable that this mounting of the indicator upon the gauging fixture or machine element may be so accomplished that the cooperative relationship of the actuating part of the one and the actuated part of the other may be readily adjusted to produce accurate indication by the indicator. Furthermore, it is desirable that once the desired adjustment has been accomplished, the two elements may be locked securely together to continue to function properly.

My improved holding device is designed to be associated with conventional indicators as set forth above to mount any one of them upon a gauging fixture or machine element. It is also so designed as to be capable of adjustment to properly position such indicator upon any such fixture.

In many cases in which indicators must be so mounted as hereinabove set forth, there are narrow space limitations within which the device must be passed and must function.

It is standard practice in industry to provide the indicator case with a short cylindric stem of approximately three-eighths of an inch in diameter by means of which the indicator must be mounted. My improved holding device is intended to be used with an indicator provided with such a stem.

An object of my holding device is the provision of such a device which is simple, inexpensive, easily attached to the stem of the indicator and to the fixture or gauging element, and which is readily manually adjustable to position the indicator with respect to the gauging fixture or machine element.

Another object is the provision of such a holding device which is capable of being used with a wide variety of indicators provided with securing stems as hereinabove set forth and wherein the connection of the indicator with the fixture may be quickly accomplished and the adjustment of the indicator thereupon may be quickly and accurately carried out.

Other objects, advantages, and meritorious features will more fully appear from the following specification, claims, and accompanying drawings, wherein:

FIG. 1 is an elevation partly in section showing my improved holding device mounting an indicator upon a fixture or the like;

FIG. 2 is a cross sectional view taken on the line 2—2 of FIG. 1;

FIG. 3 is a cross sectional view taken on the line 3—3 of FIG. 1;

FIG. 4 is a cross sectional view taken on the line 4—4 of FIG. 1;

FIG. 5 is a cross sectional view taken on the line 5—5 of FIG. 1;

Figure 6:
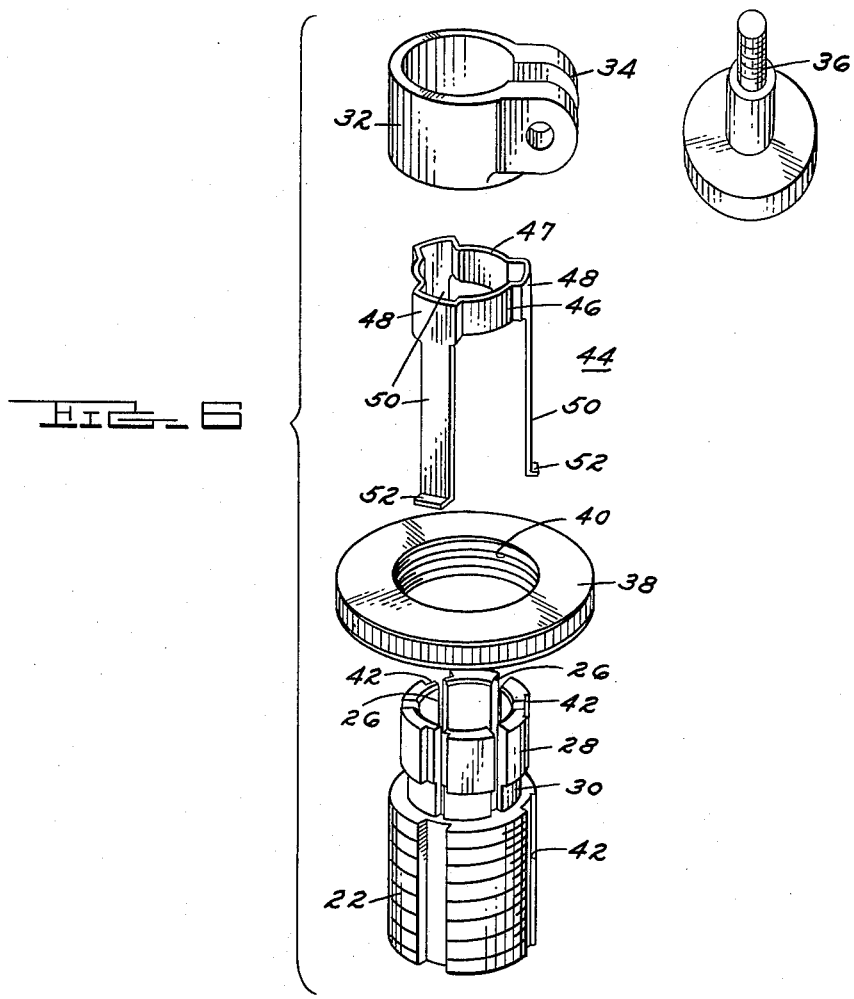
FIG. 6 is an exploded view showing in perspective the several parts of my improved holding device arranged generally in the order in which they would be fitted together.

The holding device of this invention is adapted to be used to mount an indicator of the character hereinabove set forth upon a fixture or machine element in such a manner that the indicator actuating part of the fixture or machine element is so disposed with respect to the indicator plunger or the like as to actuate the same. The indicator is also so supported upon the fixture by means of the holder that it may be adjustably positioned with respect to the fixture and without removing the same therefrom as to accomplish that adjustment of the indicator plunger which so positions the same with respect to the actuating element of the fixture that the readings given by the indicator will be proper and accurate.

Numeral 10 indicates in FIG. 1 a fixture or machine element having an indicator actuator 12 supported for axial movement. A conventional dial indicator 14 is as shown provided with a supporting stem 16. The stems of indicators of this character are commonly of a cylindric shape and a generally accepted standard diameter is three-eighths of an inch. The stems are relatively short as shown. There is supported for axial movement within the stem a plunger 18. The lower end of the plunger rests upon the upper end of the indicator actuator 12 of the fixture. It is the axial movement of this plunger 18 which actuates the indicating mechanism that is read upon the dial of the indicator.

The indicator is mounted upon the fixture through the provision of my improved holding device. The passageway 20 through the fixture and through which its indicator actuator moves is counterbored at its upper end to threadedly receive the lower end of an externally threaded barrel 22. It will be noted that the barrel is threaded into the counterbore until it bottoms therein and therefore becomes a fixed part of the fixture or machine element which carries the indicator actuator 12.

The barrel 22 is shown in more detail in FIG. 6. The major and lower end portion of the barrel is provided with fine screw threads 24. The upper end portion of the barrel has an external cylindrical surface the diameter of which is slightly less than the root diameter of the screw threads 24. This upper reduced diameter cylindric portion is provided with a plurality (here shown as 6) of narrow radial slits 26 circumferentially spaced and extending linearly of the reduced upper end portion of the barrel. Such slits provide a plurality of segments or locking jaws 28 after the manner of a conventional lathe collet.

At the lower end of these jaws 28 and adjacent to the threaded portion of the barrel there is an annular groove 30. This annular groove extends completely about the barrel and augments the radial flexibility of the jaws 28. This upper end portion of the barrel is adapted to receive the stem 16 of the indicator as shown in FIG. 1. Such indicator stem is slidable axially within the barrel to adjusted positions. Flexibility of the segments 28 or gripping jaws permits them to be contracted and gripped about the stem to maintain the indicator at adjusted positions with respect to the barrel.

A ring clamp 32 is adapted to be received over the contractile upper end of the barrel as shown in FIG. 1. The ring clamp is split and has complementary ears 34 at the split through which ears a binder screw 36 is threaded to tighten the clamp about the upper end portion of the barrel or to release it therefrom. Due to the contractile character of this upper end portion of the barrel, the ring clamp functions to hold it at any adjusted position with respect to the stem 16 of the indicator.

An adjusting nut 38 is threaded upon the lower end of the barrel as shown in FIG. 1. Because of the fine threads this adjusting nut is capable of minute increments of adjustment. The inner circumference of the nut is provided with a circumferential groove 40 for a purpose hereinafter described. It is through manual adjustment of this nut upon the barrel and its connection with the indicator body that the adjustable positioning of the indicator is accomplished.

The barrel is provided, as shown particularly in FIG. 6, with a plurality of passageways or grooves 42 extending lengthwise of the barrel. Three of these grooves are shown. They may extend from one end of the barrel to the other as shown in FIG. 6 or may terminate short of the bottom of the barrel as shown in FIG. 1. Each of the grooves overlaps one of the slits 26 as appears in FIG. 6.

There is provided a spring collet 44 shown in perspective in FIG. 6 and in use in FIGS. 1–5. This spring collet has annular portion 46 which is resilient and receivable about the end of the stem of the indicator adjacent to the body of the indicator as shown in FIG. 1. The upper inner circumferential edge of this collet annulus is chamfered as indicated at 47. This annular portion of the collet is provided with a plurality of radial offsets 48, three being here shown. These offsets are illustrated as spaced circumferentially about the ring portion of the collet. Each of these offsets has an extension parallel to the axis of the collet in the form of a leg 50 as shown in FIG. 6. These legs 50 are disposed within and extend slidably through the grooves 42 in the barrel and spaced below the exterior surface of the barrel so that the legs have a free sliding fit through the passageways 42 of the barrel.

The offsets 48 increase the circular and diametrical flexibility of the annular portion 46 of the collet. They also serve to support the legs as shown so that such legs are freely slidable through the passageways 42 and clear the bottoms of such passageways and also clear the ring clamp 32. The collet legs 50 have feet 52 which feet seat within the groove 40 about the inner circumference of the adjusting nut 38 as shown in FIG. 1.

It will be seen, therefore, that when the nut 38 is adjusted upon the body of the barrel it will, through the legs 50 and the collet, lift said collet to adjust the position of the indicator with respect to the fixture 10, assuming that the clamp device 32 has been released to permit adjustment of the stem of the indicator within the upper end of the barrel. The barrel, it will be noted, is fixed at a definite position with respect to the fixture through being bottomed in the counterbore as hereinabove described. The position of the plunger 18 of the indicator can be set at zero or as desired when contact is made with the indicator actuator 12 as shown in FIG. 1 through adjustment of the nut 38.

What I claim is:

1. A holding device for mounting an indicator provided with a stem having an indicator plunger supported within the stem for axial movement upon a fixture having an indicator actuator and so mounting the indicator upon the fixture that the plunger of the indicator is disposed in axial alignment and to be actuated by the actuator of the fixture, said holding device comprising, in combination, a barrel having its lower end mounted upon the fixture surrounding the indicator actuator and having its upper end contractibly received about the stem of the indicator for adjustment of the indicator stem axially of and within the barrel, a clamp about the upper end of the barrel adjustable to grip said upper end of the barrel at axially adjusted positions about the stem of the indicator, a nut adjustably threaded upon the barrel below the clamp, a spring collet encircling the stem of the indicator above the upper end of the barrel and having legs extending linearly of the barrel and coupled with the nut to shift the indicator with respect to the barrel upon adjustment of the nut thereover.

2. A holding device adapted to secure an indicator provided with a stem upon a fixture or the like comprising, in combination, a cylindrical barrel having an externally threaded lower end portion and having an externally contractile upper end portion adapted to receive the indicator stem for axially adjustable slidable movement therewithin, a clamp encircling the upper contractile end of the barrel and operable to contract the same about the stem, said barrel having a plurality of circumferentially spaced passageways extending lengthwise of the outer surface of the barrel, an adjusting nut threaded upon the lower end portion of the barrel, and a spring collet having an annular portion adapted to grippingly encircle the stem of the indicator above the upper end of the barrel and having legs depending from the annulus slidably disposed within the passageways of the barrel and coupled with the adjusting nut mounted upon the barrel.

3. A holding device for mounting an indicator provided with a stem having an indicator plunger supported therein for axial movement upon a fixture having an indicator actuator and so mounting the indicator upon the fixture that the plunger of the indicator is disposed to be moved by the actuator of the fixture; said holding device comprising, in combination, a barrel having one end mounted upon the fixture surrounding the indicator actuator and having its opposite end surrounding the stem of the indicator, said opposite end of the barrel adapted to be releasably secured to the stem at axially adjusted positions of the stem therewithin to support the indicator upon the fixture with the indicator plunger disposed to be moved by the actuator of the fixture, and adjusting means coupled with the barrel for adjustment axially thereover and having a part coupled with the indicator operable to shift the position of the indicator stem within and with respect to the barrel and axially thereof to position the indicator plunger axially with respect to the actuation of the fixture.

4. A holding device as defined in claim 3 characterized in that the adjusting means is threadedly coupled with the barrel for movement axially thereover to adjusted positions relative thereto and includes a part which extends lengthwise of the barrel and is coupled with the indicator to shift the indicator stem within and with respect to the barrel upon threaded adjustment of said means with respect to the barrel.

5. A holding device as defined in claim 3 characterized in that the opposite end of the barrel, which surrounds the stem of the indicator, is split into a plurality of linear segments relatively contractible about the indicator stem, and a clamping device is received about the segmented end of the barrel and is operable to contract the same about the stem to hold the indicator stem at axially adjusted positions within the barrel, said stem being axially adjustable within the barrel when the clamping device is released therefrom, and further characterized in that adjusting means is provided including a part threadedly coupled with the barrel for adjustment axially thereover and another part coupled with the first part and extending lengthwise of the barrel and coupled with the indicator beyond the opposite end of the barrel to adjust the indicator stem within the barrel and position the indicator plunger with respect to the fixture actuator.

6. A holding device as defined in claim 3 characterized in that the upper end of the barrel, which is adapted to receive the stem of the indicator, is split into a plurality of linear segments relatively contractible about the stem, and a clamping device is received about the segmented end of the barrel and is operable to contract the same about the stem of the indicator to hold the indicator at adjusted positions relative to the barrel, and further characterized in that said barrel is externally threaded at the end adjacent to the fixture and is provided with a linearly extending external passageway, and adjusting means is provided including a nut threaded upon the barrel adjacent to the fixture and a part extends from said nut through the linearly extending passageway of the barrel to the indicator and is operable to shift the indicator stem within the barrel upon adjustment of the nut over the barrel to position the indicator with respect to the fixture.

7. A holding device for mounting an indicator provided with a stem having an indicator plunger supported therein for axial movement upon a fixture having an indicator actuator and so mounting the indicator upon the fixture that the plunger of the indicator is disposed to be actuated by the actuator of the fixture; said holding device comprising, in combination, a barrel having one end mounted upon the fixture surrounding the indicator actuator, said barrel having an externally threaded portion above the fixture and having its opposite end surrounding the stem of the indicator and supporting the indicator for adjustment axially of the barrel, and opposite end of the barrel being contractile and provided with a plurality of passageways extending lengthwise thereof, a clamp encircling the contractile opposite end of the barrel and adjustable to grip the barrel about the stem at adjusted positions of the stem within the barrel to support the indicator at adjusted positions above the fixture, an adjusting nut threaded upon the barrel spaced below said clamp, a collet having one part surrounding the stem above the barrel spacing the indicator above the upper end of the barrel, said collet having a plurality of axially extending fingers extending through said passageways of the barrel inwardly of said clamp and extending lengthwise of the threaded portion of the barrel and coupled with said adjustment nut to be actuated thereby to position the indicator relative to the barrel.

8. A holding device for mounting an indicator provided with a stem having an indicator plunger supported therein for axial movement upon a fixture having an indicator actuator and so mounting the indicator upon the fixture that the plunger of the indicator is disposed to be actuated by the actuator of the fixture; said holding device comprising, in combination, a barrel having one end mounted upon the fixture surrounding the indicator actuator and having its opposite end surrounding the stem of the indicator and supporting the indicator for adjustment axially of the barrel, said barrel having its opposite end split lengthwise at a plurality of points providing circumferentially spaced segments contractile against the stem, a clamp encircling said segments of the barrel and adjustable to contract the same against the stem at adjusted positions or releasable to permit adjustment of the stem axially within the barrel, said barrel being externally threaded below its segmented end, an adjusting nut threaded upon the barrel below its segmented end, said barrel provided with a plurality of circumferentially spaced passageways extending lengthwise of the segmented and threaded portion of the barrel, a spring collet having an annular part grippingly encircling the stem above the upper end of the barrel spacing the indicator above the upper end of the barrel, said collet provided with spring fingers extending downwardly away from its annular part and through the passageways of the barrel spaced underneath the clamp and underneath the adjusting nut, said spring fingers having their lower ends inturned into an annular groove about the inner circumference of the nut, said nut being provided with said groove.

References Cited in the file of this patent
UNITED STATES PATENTS 2,207,396    Edelen _____ July 9, 1940
2,776,494    Sheppard _____ Jan. 8, 1957